(12) United States Patent
Villar et al.

(10) Patent No.: US 12,432,282 B2
(45) Date of Patent: Sep. 30, 2025

(54) AUTOMATED SUBSCRIPTION MANAGEMENT SERVICE

(71) Applicant: Lightswitch, Inc., New York, NY (US)

(72) Inventors: Monica Villar, New York, NY (US); Sunny Israni, New York, NY (US)

(73) Assignee: Lightswitch, Inc., New York, NY (US)

( * ) Notice: Subject to any disclaimer, the term of this patent is extended or adjusted under 35 U.S.C. 154(b) by 77 days.

(21) Appl. No.: 18/543,184

(22) Filed: Dec. 18, 2023

(65) Prior Publication Data

US 2024/0214459 A1   Jun. 27, 2024

Related U.S. Application Data

(60) Provisional application No. 63/477,346, filed on Dec. 27, 2022.

(51) Int. Cl.
*H04L 67/51* (2022.01)
(52) U.S. Cl.
CPC .................................... *H04L 67/51* (2022.05)
(58) Field of Classification Search
None
See application file for complete search history.

(56) References Cited

U.S. PATENT DOCUMENTS

| | | | |
|---|---|---|---|
| 2021/0271459 A1* | 9/2021 | Damodharan | G06F 9/451 |
| 2021/0400147 A1* | 12/2021 | Benkreira | H04W 4/24 |
| 2022/0286565 A1* | 9/2022 | Chauhan | H04M 15/745 |

* cited by examiner

*Primary Examiner* — Lance Leonard Barry
(74) *Attorney, Agent, or Firm* — Polsinelli PC

(57) ABSTRACT

Disclosed are systems for automatic management of a subscription service provided by a subscription provider. In one example, this technology provides a software development kit that creates a selection interface on a subscription service's platform where the user account can choose to enroll in the subscription management service. The subscription management service will thereafter analyze subscription data to determine whether the subscription package for the subscription service should be modified, and query the user account to modify their subscription package based on predetermined thresholds provided by machine learning algorithms. In another example, the present technology creates a unique payment card at the subscription management service that the user account can control for the purposes of subscription management. Based on user account selection or machine learning, the unique payment card can accept or deny requests to re-enroll in subscription packages.

20 Claims, 10 Drawing Sheets

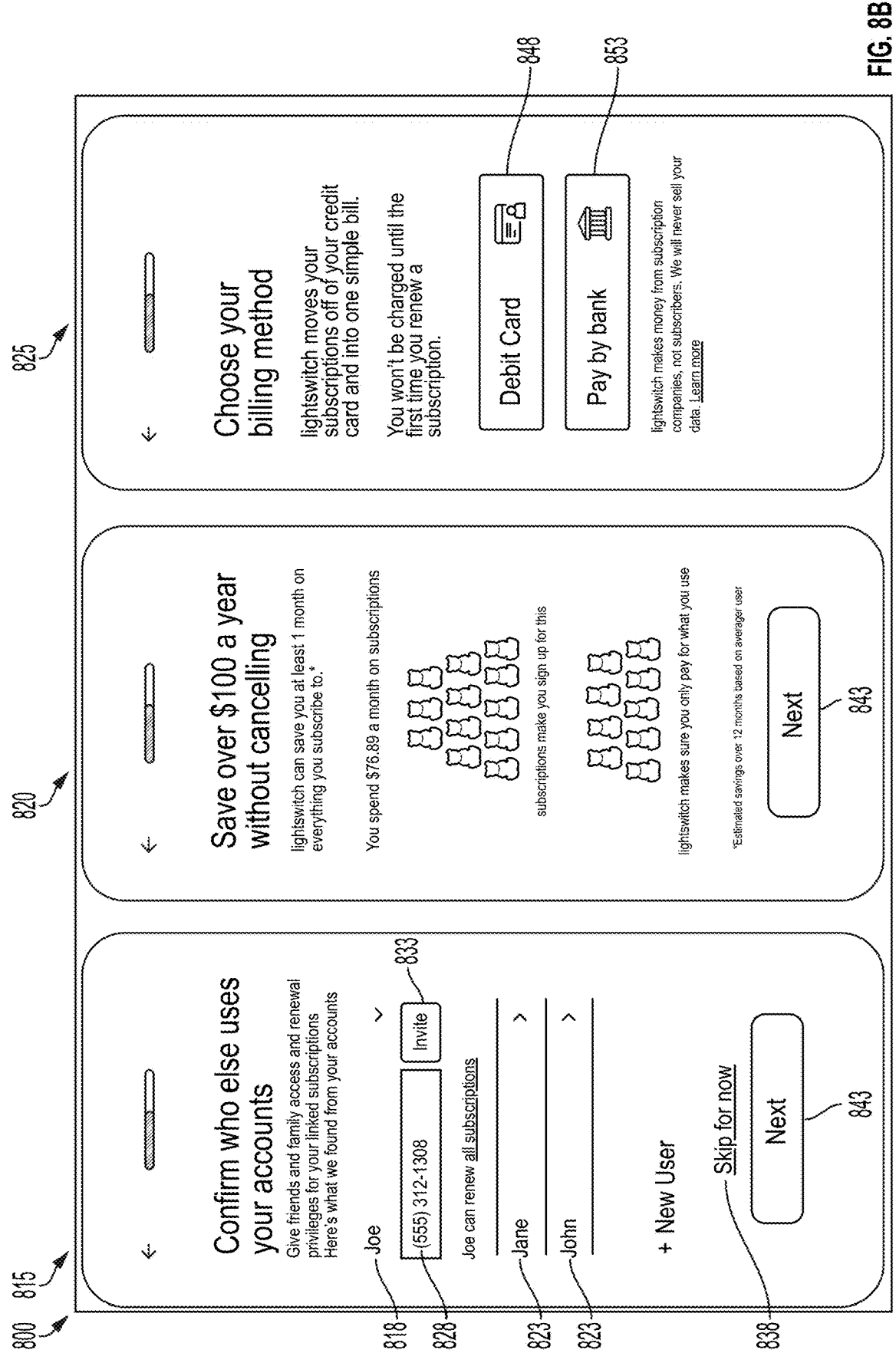

AUTOMATED SUBSCRIPTION MANAGEMENT SERVICE

CROSS REFERENCE TO RELATED APPLICATIONS

This application claims priority to U.S. Patent Application Ser. No. 63/477,346, filed Dec. 27, 2022, the contents of which are hereby incorporated by reference in their entirety.

BACKGROUND

Many software packages, multimedia content providers, and service providers offer their services on a subscription basis. Subscribers now have many subscriptions to many different subscription service providers, and managing these subscriptions has become difficult. In some cases, it is hard for subscribers to remember all the subscription service providers that they have subscriptions with. In other cases, subscribers might not realize that they've signed up for a recurring or auto-renewing subscription. In addition, subscribers might access or consume these services on an inconsistent basis; meanwhile, the subscription service providers continue to collect payment for the subscriber's use of the services irrespective of whether the subscriber made use of those services during a previous interval or plans to use those services during a future interval.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 8A, 8B, and 8C illustrate a user interface for enabling the extension of a subscription service to a group-enabled subscriber user account.

DETAILED DESCRIPTION

Figure 1:
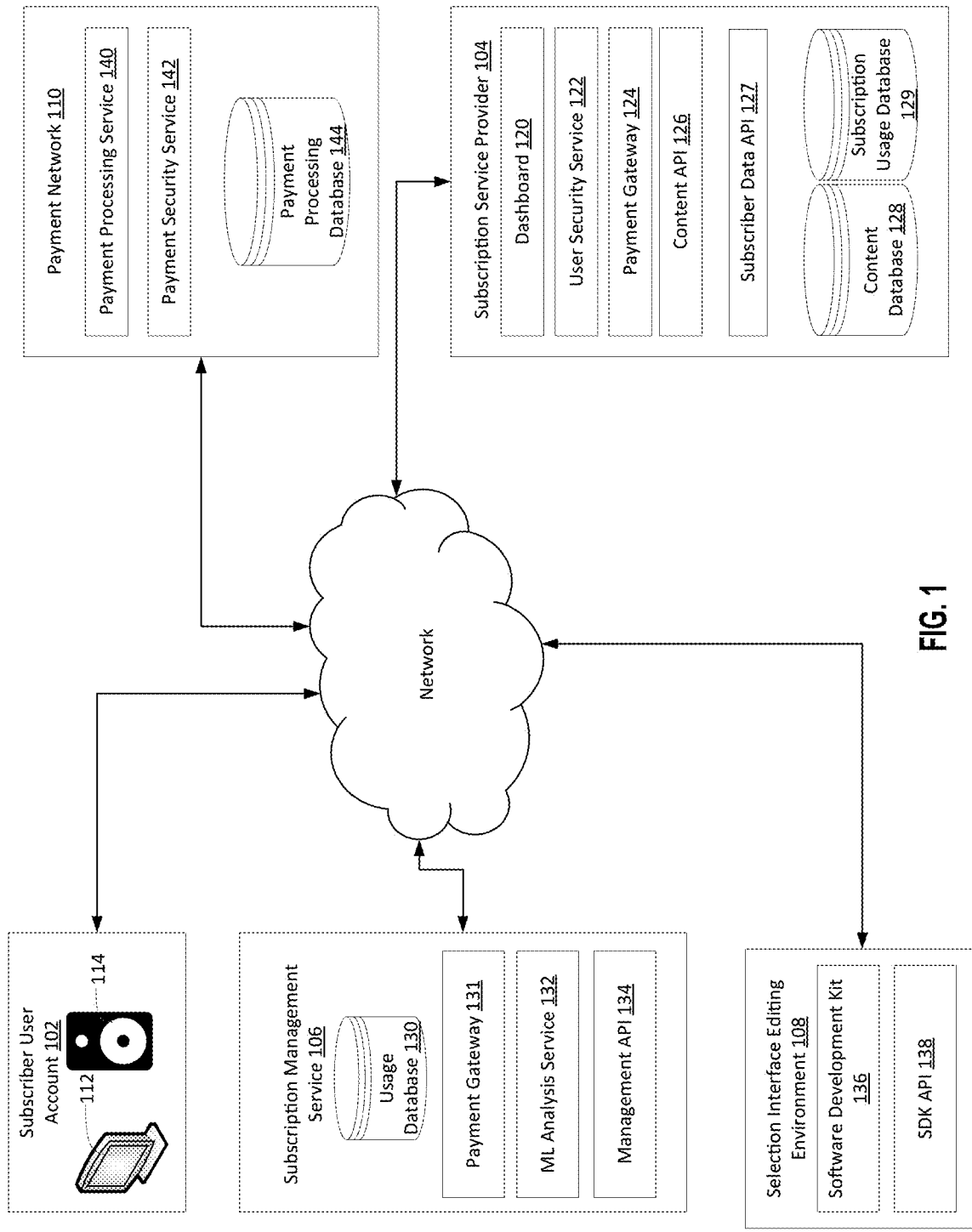
FIG. 1 illustrates an example network architecture for managing subscription packages of a user account by a subscription management service.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology aims to solve the age-old problem of poorly-utilized subscriptions. User accounts often subscribe to a service and are later automatically resubscribed for that same service even when they no longer use the service. Conversely, user accounts cancel unwanted subscriptions but may benefit from some aspect of the subscribed-to service, and yet lose these beneficial services when the subscription is canceled. The present technology can also provide benefits to subscription service providers. Subscription service providers suffer from churn of subscriber user accounts and recruitment and engagement of new subscriber user accounts.

Although the above-mentioned challenges are germane to a subscription service, the solutions to such problems have been elusive. While subscriptions have existed for a long time, it is only recently that so many services are provided through a subscription model. The prevalence of so many subscription offerings has created a rather large subscription economy, and this has magnified the above challenges. At the same time, the scale of the modern subscription economy may also be part of the solution. The present technology aims to take advantage of the scale of the subscription economy to apply a big data solution to the problems addressed above.

The present technology can provide benefits to subscriber user accounts to ensure that they are not subscribing to services that they are not consuming while at the same time collecting data about user accounts' consumption of many different subscription services. In some aspects, the present technology acknowledges that subscriber user accounts and subscription providers suffer from different sides of the same problem. And, until now, attempted solutions focused on business-centric solutions that modify the value proposition between the subscriber user accounts and the service. However, such solutions are naïve because they focus only on the relationship between the subscriber user accounts and the service and fail to account for factors extrinsic to the 1:1 subscriber user account-service relationship. They fail to recognize the stresses on the subscriber user account-service relationship caused by the broader subscription economy.

For example, if a subscriber user account of a first video-on-demand service is currently binge-watching a series on a second video-on-demand service, it should not be surprising that the subscriber user account feels as though they are wasting resources by subscribing to the first video-on-demand service during this period.

The present technology addresses the above challenges at the subscription economy level, rather than the subscriber user account-service relationship level. The present technology provides a big data platform to learn the dynamics of the subscription economy and to provide solutions.

While the present technology will provide benefits to subscriber user accounts and services, the present technology will have an enormous technological impact. Especially when aggregated over many subscriber devices, the present technology will result in less onboarding webpages served, fewer interactions to cancel subscription services, less interfaces served to access and log into various subscription platforms, less targeted ad traffic, less payment card processing, etc.

The issues described above create data management issues for the subscriber and subscription service. Onboarding a subscriber requires the use of interfaces and the creation of a profile. Users tend to have several independent subscriptions, meaning several different servers would be required to serve several different interfaces just for the management of subscriptions. Targeted advertising would also be done on an independent basis limited to the data of the subscription provider—rather than across several different platforms—thus causing less efficient targeting of advertisements and poor use of computing resources. Many different payment card processors are required to service the various subscriptions, again resulting in a poor use of computing resources. And the user is subjected to different user interfaces for the various subscriptions—many of which do everything in their power to conceal how to cancel a subscription service. The present technology addresses these and problems common in the art.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example network architecture for managing subscription packages of a user account by a subscription management service. As shown, the network architecture includes a subscriber user account 102, subscription service provider 104, subscription management service 106, selection interface editing environment 108, and a payment network 110, all communicably coupled together through a network.

The subscriber user account 102 can interact with the network using a computing device 112, 114 that consumes content or otherwise uses a subscription service of the subscription service provider 104. As shown, the subscriber user account 102 includes a display 112 for viewing displayable content from the subscription service provider 104, e.g., movies or videos. The computing device can also include one or more speakers 114 that output audio for consumption by the user account.

The computing device can be a client computer or device that is part of the networked environment shown in FIG. 1. The computing device can encompass a diverse array of hardware and software configurations, including but not limited to personal computers, laptops, mobile devices, tablets, smart televisions, IoT ("Internet of Things") devices, and other connected devices.

The subscription service provider 104 can be a server or other computing device of an entity that provides a subscription service, e.g., HULU or SPOTIFY. The subscription service provider 104 includes a dashboard 120 that the user account can access to select consumable content. For example, the dashboard 120 may provide a listing of available music or video that the user account may select and listen to or view. The dashboard 120 may also include a "settings" page where the user account can modify their user account settings, account information, payment information, or other relevant systemic information.

The subscription service provider 104 can also perform a variety of security services using security service 122. For example, the security service 122 can evaluate the application code created by the software development kit to ensure that the application code is safe to run on the platform of the subscription service provider 104. The security service 122 can attempt to run or load the application in a virtual environment that is a simulation of a distribution platform. The security service 122 can analyze data or code output by the subscription management service 106 to ensure it does not harbor any malicious code.

The subscription service provider 104 also includes a payment gateway 124 designed to facilitate secure and efficient electronic transactions between the subscriber computing device and the subscription service provider 104. The payment gateway 124 serves as a pivotal component in the seamless transfer of funds, ensuring a reliable and encrypted channel for processing financial transactions. This gateway integrates with diverse payment methods, including but not limited to credit cards, digital wallets, and online banking, providing a versatile platform for user accounts to conduct transactions with ease. In some embodiments, the payment gateway 124 refers the subscriber computing device to the payment network 110 to facilitate the payment of funds outside the immediate platform of the subscription service provider 104.

The subscription service provider 104 also includes a content API 126 that allows the subscriber computing device to access content provided by the subscription service provider 104. Similarly, the subscription service provider 104 includes a subscriber data API 127 that can allow access to usage data of the user account and other user account information. The content API 126 may only be accessible by entry of an authorized username and password. Similarly, the subscriber data API may only be accessible by third-party applications with predetermined access, e.g., the subscription management service 106. The content accessible through the content API 126 may be stored within a content database 128. The subscriber usage data may be stored within a subscription usage database 129.

While only one subscription service provider 104 is shown, those of ordinary skill in the art will appreciate that there can be many such subscription service providers 104 and many subscriber user accounts accessing the network via many subscriber devices to interact with the subscription service providers 104 and the subscription management service 106. Likewise, the potentially many subscription service providers 104 can be connected over the network with the subscription management service 106 and/or integrating the selection interface editing environment 108.

The subscription management service 106 acts as a partner to the subscription service provider 104 to assist the subscription service provider 104 in maintaining the subscriber user account 102 as a customer. As shown, the subscription management service 106 includes a usage database 130 that stores data from the subscriber user account 102 relating to their usage of the subscription service provider 104, and a payment gateway 131 to process subscription service payments. This usage data can be analyzed by the ML analysis service 132 to recommend subscription packages tailored to the user account. The subscription management service 106 can further include a management API 134 that assists in the communication of information between the subscription management service 106 and other components of the networked environment, including the subscription service provider 104. For example, the management API 134 can provide access to tokenized data from the usage database 130 or can further provide recommendations output by the ML analysis service 132.

Figure 7:
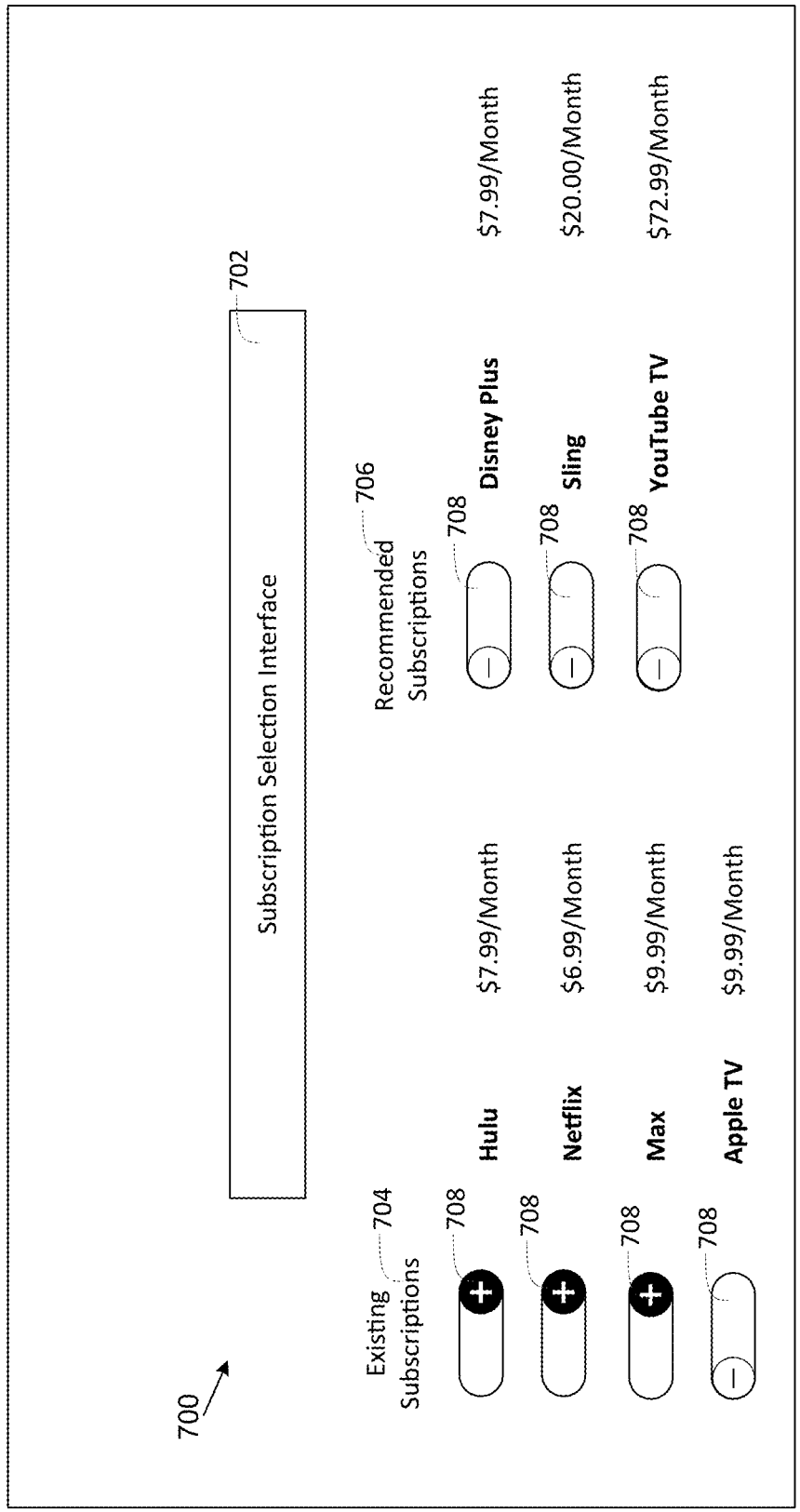
FIG. 7 illustrates a user interface displayable to a subscriber user account from a subscription management service.

In some embodiments, the subscription management service 106 includes a payment gateway 131 that allows the subscriber user account 102 to enroll in subscriptions with limited interaction with the subscription service provider 104. For example, the payment gateway 131 can be included with the subscription management service 106 such that a subscriber user account 102 may enroll their credit card, bank account, or other payment functionality into the subscription management service 106 so that the subscriber user account 102 may enroll in different subscription services or remove itself from subscription services in a frictionless process. As one example, the display 112 of the subscriber user account 102 may display a user interface that allows the user to toggle on or off the subscription services they wish to be enrolled in at any point in time, as shown in FIG. 7, described below in more detail.

The ML analysis service 132 can provide machine-learning recommendations to the subscriber user account 102 based on activity of the subscriber user account 102 itself or other user accounts accessible to the subscription management service 106. For example, the ML analysis service 132 can access the services that the subscriber user account 102 is subscribed to from the usage database 130. The ML analysis service 132 can access similar services for other user accounts from the usage database 130. Recommendations can thereafter be displayed on the display 112 of the subscriber user account 102, as discussed in further detail with respect to FIG. 7.

In some embodiments, the subscription management service 106 can provide a software development kit (SDK) 136 to extend functions and interfaces of the subscription management service 106 into the services provided by the subscription service provider 104. One example is a selection interface editing environment that allows the subscription service provider 104 to create a selection interface on a platform of the subscription service provider 104 to assist with the enrollment of the subscriber user account 102 into the program of the subscription management service 106. The software development kit (SDK) 136 can include an SDK API 138 that the subscription service provider 104 can use to obtain services and functions of the SDK 136.

The SDK 136 plays a crucial role in empowering a subscription service provider 104 to seamlessly integrate a selection interface into its platform. Unlike conventional approaches relying on independent third-party interfaces, the SDK 136 facilitates the direct embedding of the selection interface into the subscription service provider's 104 platform. This integration enhances the efficiency and fluidity of data communication between the subscription management service 106 and the subscription service provider 104, establishing a more cohesive and responsive ecosystem. This unique implementation not only optimizes the communication pathways but also bolsters the overall effectiveness of the subscription management service 106 in providing enhanced subscription experiences to end user accounts and recommendations for more efficient subscription services.

In some embodiments, the SDK 136 of the subscription management service 106 can also be used to extend subscription account features to subscription provider services 104 that don't have those account features. For example, if a subscription service provider 104 does not natively support the concept of profiles under a user account, the subscription management service can provide this functionality to a subscription service provider 104. For example, when the subscription management service 106 stores data for a user account that utilizes profiles for specific users that take advantage of the subscription of the user account, the SDK can offer interfaces and/or an API to the subscription service provider 104 such that the subscription provider's 104 servers can call an API for profiles and surface a user interface with data provided by the subscription management service 106 with the list of profiles under the user account. This can provide a benefit to the subscription service provider 104 because the subscription service provider 104 can now gain more granular information about individual users associated with the user account that are consuming services related to the subscription. This would be information that would be otherwise unavailable to the subscription service provider 104 without natively providing a user interface, database, and logic to support such an account feature. In this way, the subscription management service can provide an account management layer as a service to subscription service provider's 104.

The subscription service provider 104 refers to a server or networked computing system that plays a central role in delivering subscription-based services or content to subscriber devices 102 or other clients. The subscription service provider 104 is responsible for managing and facilitating the delivery of services, data, or content to subscriber devices 102 in exchange for predetermined subscription fees or access privileges. The subscription service provider 104 typically possesses a robust and scalable infrastructure with capabilities to host, store, and maintain databases, software applications, and digital assets necessary for the offered services. The subscription service provider 104 is equipped with advanced networking technologies to establish secure and efficient communication channels with subscriber devices 102, enabling them to access and utilize the subscribed content or services seamlessly.

The payment network 110 represents a third-party payment processor integral to the operation of the disclosed technology. This payment network serves as a crucial intermediary in facilitating secure and efficient financial transactions between subscriber devices 102 and subscription service providers 104. Leveraging advanced payment processing infrastructure, it enables the seamless exchange of funds, supporting various payment methods, including credit cards, digital wallets, bank transfers, and other financial instruments. The payment network 110 plays a pivotal role in authorizing, verifying, and executing transactions, ensuring that subscription fees, purchases, or payments for services are processed accurately and swiftly. The structure of the payment network 110 is that of a server or other network computing device. In some embodiments, the payment network 110 is a bank (e.g., BANK OF AMERICA) or a third party payment processor (e.g., SQUARE).

As shown, the payment network 110 includes a payment processing service 140 that facilitates payments by the subscriber user account 102 for services offered by the subscription service provider 104. The payment network 110 can also include a payment security service 142 that securely encrypts sensitive data provided to the payment network 110, and a payment processing database 144 that stores relevant data transmitted to the payment network 110.

The subscriber user account 102, subscription service provider 104, subscription management service 106, selection interface editing environment 108, and payment network 110 can each be operatively coupled to one another through communication links. These communication links may be established through various wired or wireless technologies, such as the internet, cellular networks, Wi-Fi, Bluetooth, or other networking protocols. The subscriber user account 102, subscription service provider 104, subscription management service 106, selection interface editing environment 108, and payment network 110 can also interact with each other via a communication channel. The communication channel can include internet communications calling one or more public application programming interfaces (APIs) of the subscription service providers 104, or the communication channel can be a more deliberate integration whereby the subscription management service 106 and subscription service providers 104 share information pertaining to subscriber user accounts' respective subscriptions.

Together, the entities illustrated in FIG. 1 provide for at least three different interaction models. In the least integrated interaction model, a subscriber user account can interact with the subscription management service 106 to manage payments for subscriptions with one or more subscription service providers 104. As will be addressed further herein, this interaction model utilizes the subscription management service 106 to reduce or eliminate payments for services provided by the subscription service provider 104 when those services are not being consumed by the subscriber user account 102. At the same time, the subscriber user account 102 can retain their account with the subscription service provider 104 and resume payments to the subscription service provider 104 when the user account desires to consume services from the subscription service provider 104.

In the intermediate integration interaction model, the subscription service provider 104 actively integrates the subscription management service 106 to aid in managing its own subscribers. The subscription management service 106 offers services to the subscription service provider 104 and to the subscriber user accounts 102. For example, the subscription management service 106 can provide data analytics and suggestions to the subscription service provider 104 based on models trained on data from many relationships with other subscription service providers 104. The analytics can be used by the subscription service provider 104 to better manage their relationship with the subscriber user accounts 102, and to make business decisions in the context of the broader subscription economy. The suggestions can be based on the analytics and can include suggestions about pricing, services offered, promotions, advertising, partnerships, etc. In some embodiments, such as when a user account that is known to the subscription management service 106 is signing up with a new subscription service provider 104, the subscription service provider 104 can gain insights about the user account from the subscription management service 106 in order to present competitive subscription packages to the user account. In this way, subscription service providers 104 can gain knowledge about a potential new user account before they even sign up. All of the functions and benefits to a subscription service provider 104 and subscriber user account 102 that were described with respect to the least integrated interaction model are included in the intermediate integration interaction model.

In the most integrated interaction model, many subscription service providers 104 integrate with the subscription management service 106 to sign up and manage subscriber user accounts 102. In this interaction model, the subscription management service 106 can use its data analytics and suggestions capabilities to actively manage a user account by suggesting services of interest to the user account. In some embodiments, this can include suggesting bundles of services. In some embodiments, this can include adjusting pricing terms or subscription durations. In this most integrated interaction model, the subscription management service 106 can be a single interface or single provider for signing up with multiple subscription providers 104. In this way, the subscription management service 106 can provide an account layer across many otherwise unrelated service providers 104. All of the functions and benefits to a subscription service provider 104 and subscriber user account 102 that were described with respect to the intermediate integration interaction model and the least integrated interaction model are included in the most integrated interaction model.

Figure 2:
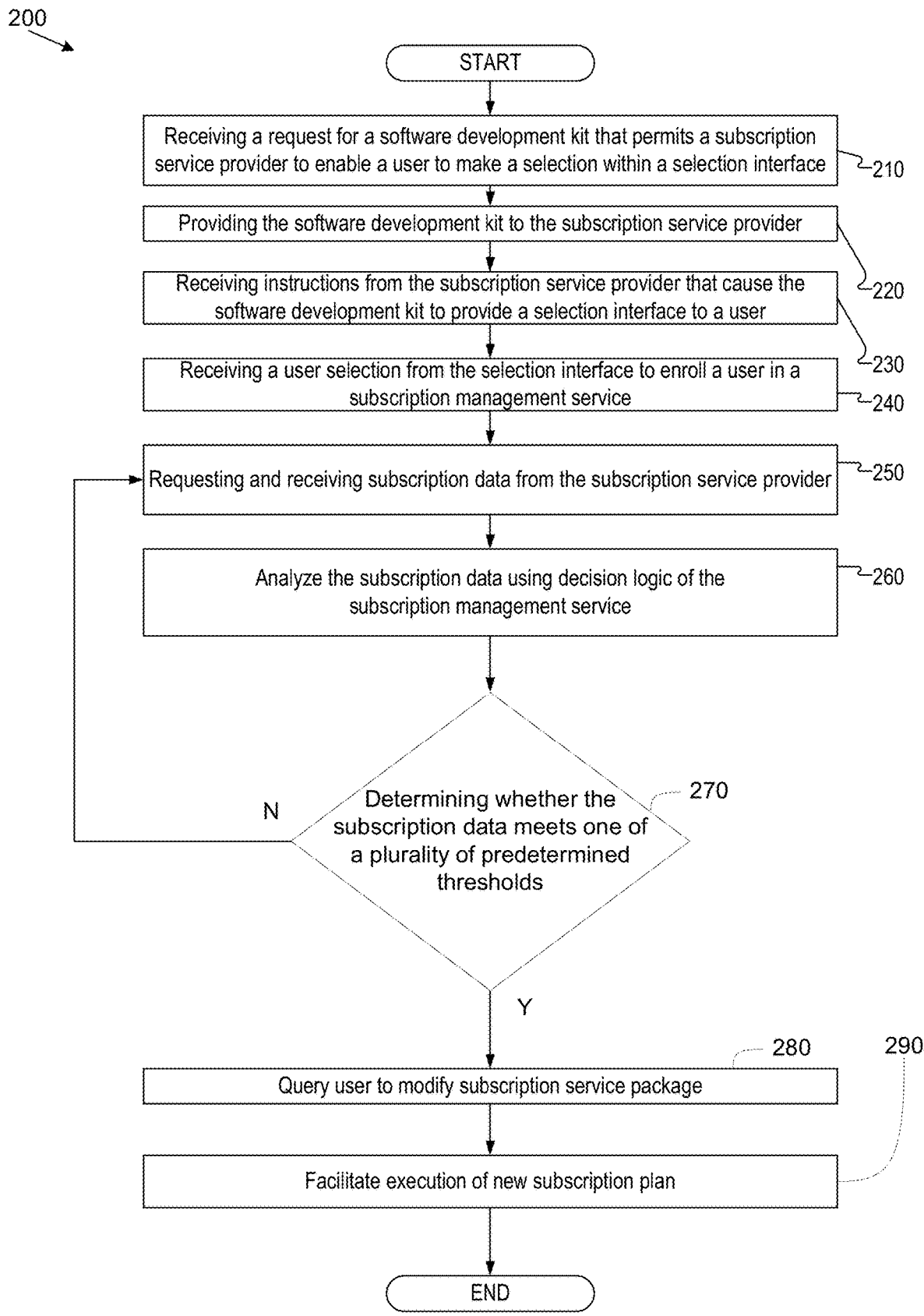
FIG. 2 illustrates an example method for managing subscription packages to enable more efficient usage of the services provided in the subscription packages.

FIG. 2 illustrates an example process 200 for automatically managing subscriptions. Although the example process 200 depicts a particular sequence of operations, the sequence may be altered without departing from the scope of the present disclosure. For example, some of the operations depicted may be performed in parallel or in a different sequence that does not materially affect the function of the process. In other examples, different components of an example device or system that implements the process may perform functions at substantially the same time or in a specific sequence.

As shown, the method 200 is written from the perspective of the subscription management service 106 and/or the selection interface editing environment 108. The method 200 begins and proceeds to step 210, where a request is received for a software development kit 136 that permits the subscription service provider 104 to enable a user account to make a selection within a selection interface. For example, this step can be executed when the subscription management service 106 and/or the selection interface editing environment 108 receives a request from a subscription service provider 104 for the software development kit 136.

The method 200 is an example of an integration interaction model, though the functions described with respect to method 200 can also be offered as part of the most integrated interaction model too.

The method 200 proceeds to step 220, where the subscription management service 106 and/or the selection interface editing environment 108 provides the software development kit 136 to the subscription service provider 104. For example, the subscription management service 106 and/or the selection interface editing environment 108 can grant the subscription service provider 104 access to the selection interface editing environment 108, thereby providing the software development kit 136 to the subscription service provider.

The method 200 then proceeds to step 230, where the selection interface is created. Here, the selection interface editing environment 108 receives instructions from the subscription service provider 104 to create the selection interface. These instructions are input into the software development kit 136 to create a button, tab, pull down, or any other interface capable of accepting a user account command to thereby cause enrollment of the user account into the subscription management service's 106 system.

The method then proceeds to step 240, where the subscription management service 106 receives instructions from the user account to enroll in the subscription management method. In one example, the subscription management service 106 receives instructions from the subscription service provider 104 based on a selection by the user account to enroll in the subscription management service. As described above, the selection by the user account can be the selection of a button, tab, pull down, or any other interface.

This selection interface can appear at any time in the user account's relationship with the subscription service provider 104, but can specifically appear when the user account opts to modify or cancel their service. For example, the selection interface can be displayed on a user display of the subscriber device when the user account selects "Cancel Subscription." Rather than allow cancellation as the only option, the selection interface can also display "Pause Service" or other language as a second option, at which point the user account will have elected to select the subscription management service 106 to manage the subscription service. Here, the subscription will be discontinued at the end of the current pre-paid billing cycle, but the user account and payment information will remain active within the subscription management service 106 so that renewing the service will be easier.

Steps 210-240 are not limited to a time when the user account cancels their service. For example, the selection interface can appear when the user account opts to begin their service. In this instance, the selection interface can provide a method for the user account to opt-in to the subscription management service 106 such as a button or pull down menu that includes an option to "Opt-In to Subscription Service Manager". Here, the subscription service manager 106 can act as a gatekeeper to prevent unwanted subscriptions (as described below with respect to FIGS. 3 and 4) or to provide suggested alterations to the current subscription of the user account (as described immediately below).

In step 250, the subscription management service 106 can request and receive subscription data from the subscription service provider 104. The subscription data can include data relating to the usage of the services provided by the subscription service provider 104 by the user account. Using a video service as an example, the subscription service provider 104 can transmit usage data, such as the amount of content viewed during a particular period of time, or specific channels, shows, or genres that the user account views more than others, or higher usage time intervals such as the evenings or weekends, or any other data that may inform the subscription management service 106 of the user account's preferences. In step 250, the subscription management service 106 can request and the subscription service provider 104 can provide access tokens to the subscription management service 106, and the subscription management service 106 can further provide access tokens to the subscription service provider 104, to allow bidirectional communication. To that end, the subscription data stored at the subscription management service 106 can be tokenized or otherwise encrypted to safeguard privacy concerns.

It will be appreciated by those of ordinary skill in the art, that the subscription management service 106 will be receiving the subscription data from many different partner subscription providers 104. In this way, the subscription management service 106 will have access to data from across the subscription economy, which can be used for analysis such as described with respect to step 260.

In step 260, the subscription management service 106 can analyze the subscription data to consider better subscription plans for the user account. Using data from either the subscription provider 104 or some or all partner subscription providers 104, the subscription management service 106 can provide analytics or recommendations to the subscription provider 104. One type of analytics that can be valuable (using the video service provider example) is to analyze requests to cancel a subscription as indexed by content consumed by user accounts across partner subscription providers. This can provide insights about how new and very popular releases on a competitor subscription provider might effect the subscription provider. Likewise, some useful recommendations can be provided by the subscription management service that suggest optimizations to a subscription that might be expected to cause less requests to cancel a subscription, or that retain a subscriber that is likely to request to cancel, or to retain a subscriber after a request to cancel. For example, the subscription management service 106 can analyze the usage data of the subscriber device to recommend content related to the content represented by the subscription data. In some embodiments, the subscription management service 106 can analyze a duration of the subscription, compare that duration to the quantity of content consumed by the user account, and recommend an increased or decreased duration of the subscription if the result of the analysis is above or below a predetermined threshold. The subscription management service 106 can recommend to the user account to increase the duration of their subscription, but for less content, in exchange for a lower monthly payment. In some embodiments, the subscription management service can determine that, or in addition to the above, the subscription management service 106 can recommend bundles of multiple subscription services based on the existing services used by the user. In some embodiments, the subscription management service 106 can determine that a more favorable plan for the subscriber and the subscription services managed by the subscription management service 106 is a plan based on credits issued by the subscription management service 106 that can be exchanged across a plurality of subscription providers for access to services. In each instance of step 260, the analyzing can be performed by the decision logic of the processor of the subscription management service 106, as described structurally below with respect to FIG. 6.

In addition to suggestions for how to adjust the subscription for a subscriber user account, the subscription management service can also provide suggestions for when to release a subscription service provider's most popular content.

The method 200 then proceeds to step 270, where the subscription management service 106 determines whether the subscription data meets one of a plurality of predetermined thresholds. For example, the subscription management service 106 can compare the subscription data against data stored in the usage database 130 for user accounts other than the user account, and make the determination based on a statistical analysis or a machine learning analysis of the other user accounts. For example, the subscription management service 106 can compare the amount of usage of the subscription services and the duration of the subscription to the average of the other user accounts, whose data is stored in the usage database 130. If the amount of usage is below the average of the other user accounts, the subscription management service 106 can recommend a subscription package with less content or a shorter duration, or pausing the subscription without unsubscribing. If the amount of usage is above the average of the user accounts, the subscription management service 106 can omit any recommendation and return to step 250.

In step 280, the subscription management service 106 can query the user account to modify their subscription service package. If accepted, the subscription management service 106 can facilitate execution of a new subscription plan in step 290. For example, the subscription management service

106 can provide the user account with a new agreement that modifies the scope, duration, and/or cost of the subscription plan, and that accepts pre-payment for the new plan by connecting the user account with the payment network 110. Thereafter, the method 200 ends.

Figure 3:
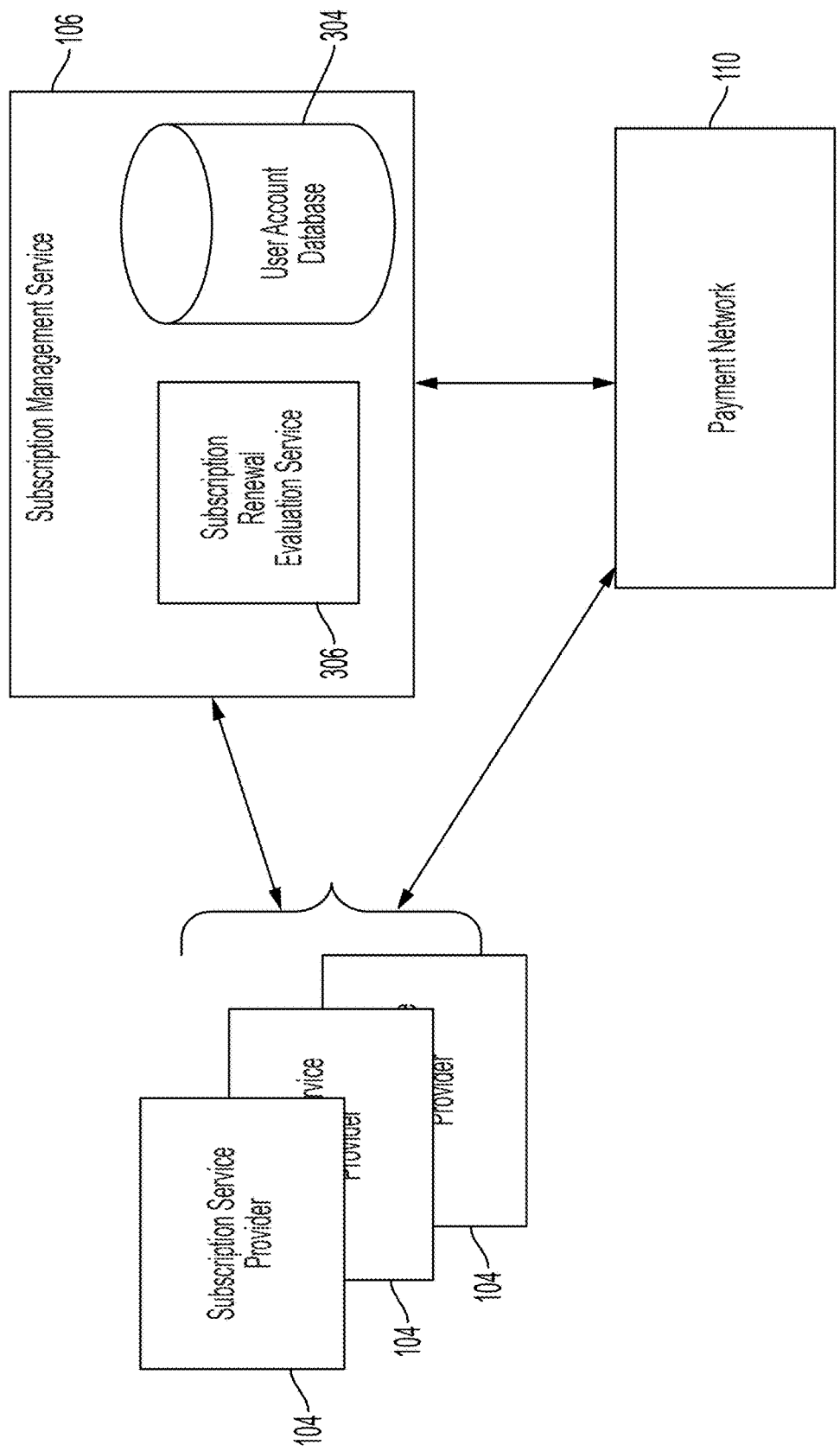
FIG. 3 illustrates an example system where the subscription management service manages one or more subscription packages with subscription service providers on behalf of one or more user accounts in accordance with some aspects of the present technology.

FIG. 3 illustrates an example system where the subscription management service 106 manages one or more subscriptions with subscription service providers 104 on behalf of one or more subscriber user accounts. As illustrated in FIG. 3, the subscription management service 102 can manage a payment card through an interface with the payment network 110. The subscription management service 106 can also interact with the one or more subscription service providers 104 through a communication channel. The communication channel can include internet communications calling one or more public APIs of the subscription service providers 104, or the communication channel can be a more deliberate integration whereby the subscription management service 102 and subscription service providers 104 share information pertaining to subscriber user accounts' respective subscriptions. The structure and function of the individual components in FIG. 3 is similar to that of FIG. 1, but is focused more on protection of the user account from unwanted subscriptions.

Figure 4:
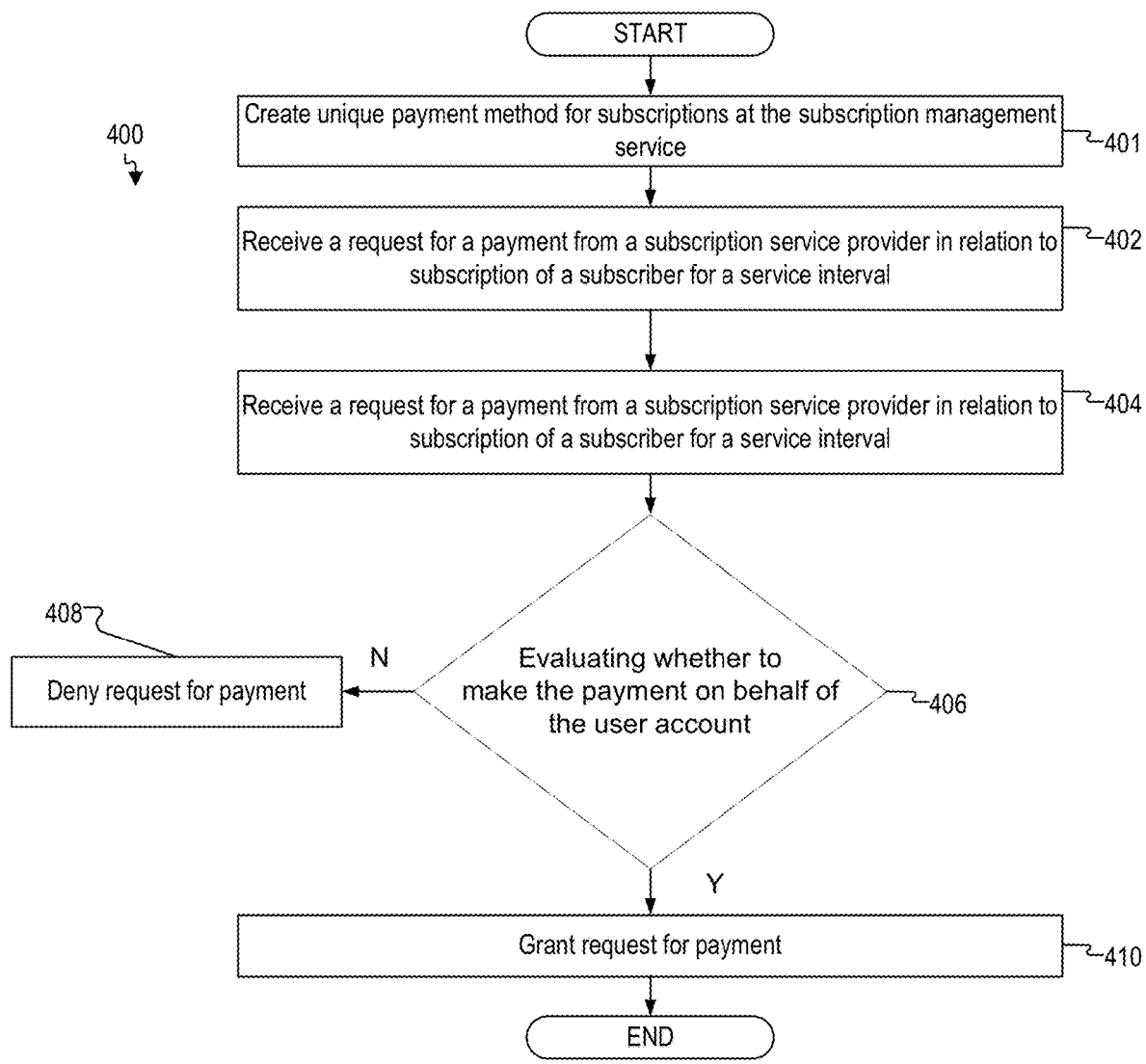
FIG. 4 illustrates an example method for automatically managing subscription packages in accordance with some aspects of the present technology.

FIG. 4 illustrates an example method 400 for automatically managing subscriptions. Although the example method 400 depicts a particular sequence of operations, the sequence may be altered without departing from the scope of the present disclosure. For example, some of the operations depicted may be performed in parallel or in a different sequence that does not materially affect the function of the process. In other examples, different components of an example device or system that implements the process may perform functions at substantially the same time or in a specific sequence.

The method illustrated in FIG. 4 is an example of the least integrated interaction model.

According to some examples, the method 400 begins by creating a unique payment method for subscriptions at the subscription management service 106. In some embodiments, a subscriber to a subscription service provider 104 can maintain a user account with the subscription management service 106 despite not having access to the subscribed-to content. For example, the subscriber user account to a subscription service provider 104 can deposit funds into their user account at the subscription management service 106, which is then used to fund a payment card that is issued to the subscriber user account by the subscription management service 106. The subscriber user account uses the payment card as their payment method either at sign-up with a subscription service provider 104, or to replace an existing card on file with the subscription service provider 104. After a current billing cycle expires, payments to the subscription service provider 104 can fail by default, causing the subscription service provider 104 to suspend the service by the subscription service provider 104 until payment is reinstated. At the point in time that the subscriber user account wishes to reactivate a subscription for another pre-paid term, they will notify the subscription management service 106 via an interface and/or by attempting to access the subscription service 104 via login at the subscription service provider 104, which will prompt the subscription management service 106 to authorize select transactions from the selected subscription service provider 104, and prompt the user account to request that the subscription service provider 104 retry the transaction request, which once completed will allow the subscription service provider 104 to reinstate service.

While this description refers to a withheld payment as a mechanism to suspend a subscription with a subscription service provider 104, some subscription service providers 104 might demonstrate different behaviors that the subscription management service 106 can accommodate. For example, a similar result can be achieved through a more deliberate interaction with the subscription service provider 104 when the subscription management service 106 integrates with the subscription service provider 104 to create an automatic pause option. In some embodiments, where there is less integration between the subscription management service 106 and the subscription service provider 104, it might be that a failure to pay for the subscription one month might result in the automatic cancelation of the user account. Even in this scenario, the subscription management service 106 can manage such an event by storing the relevant user account details such that the subscription management service 106 can automatically or semi-automatically resubscribe the user account to the subscription service provider 104 in the future.

When a user account of the subscription management service 106 adds a subscription, they can change the payment method on file for with the subscription service provider 104 with the payment card issued or managed by the subscription management service 106. When the subscription service provider 104 attempts to auto-renew using the payment card managed by the subscription management service 106, the issuing bank will run the authorization on the subscription management service's 106 authorization server. The subscription management service 106 will approve the transaction if the authorization server has been instructed to approve the transaction for that merchant at the pre-specified amount.

The method then includes receiving a request for a payment from a subscription service provider in relation to the subscription of a subscriber user account for a service interval at step 402. For example, the subscription management service 106 illustrated in FIGS. 1 and 3 may receive a request for a payment from a subscription service provider 104 in relation to subscription of a subscriber user account 102 for a service interval.

According to some examples, the method 400 includes determining whether the user account has sufficient funds to make the payment to the subscription service provider at step 404. For example, the subscription management service 106 illustrated in FIGS. 1 and 3 may analyze the usage database 130 to determine the amount of funds in the user's account, or communicate with the payment network 110 to make this determination, and compare the amount of funds against the cost of the subscription service.

In step 406, the subscription management service 106 may then evaluate whether to make the payment on behalf of the user account based on the results of step 404. Like the method 200 in FIG. 2, the evaluating is performed by a trained machine learning algorithm. The trained machine learning algorithm is trained to predict whether the subscriber user account would want to actively maintain the subscription with the subscription service provider during the service interval. The evaluating is performed using a heuristic. The heuristic is used to predict whether the user account would want to actively maintain the subscription with the subscription service provider 104 during an upcoming service interval. The evaluating utilizes data available to the subscription management service 106 from the subscription service provider 104 including usage data for the subscription by the subscriber user account 102. The subscription management service 106 receives data from the subscription service provider 104 through a bi-directional two-way communication channel that is authenticated using access credentials of the subscriber user account 102 for the subscription at the subscription service provider 104. For example, the subscription management service 106 can request usage data from the subscription data API 127 of the subscription service provider 104.

According to some examples, the method 400 includes denying the request for the payment based on the results of the evaluation at step 408. For example, the subscription management service 106 illustrated in FIG. 3 may deny the request for the payment based on the results of the evaluation. Alternatively, the subscription management service 106 may grant the request for payment in step 410.

By implementing the method override and ultimately replace the "auto-renew" element of contract-free subscriptions by managing automatic payment for subscriptions for a given billing cycle until and unless the subscriber user account indicates their active usage of the service.

If subscription management service 106 fails to approve the transaction, then the payment will fail and the subscription service provider 104 will temporarily suspend service (de facto pausing service) until a transaction is successfully authorized on the card. During this period, the subscriber user account using the subscription management service 106 to manage the subscription with the subscription service provider 104 user account will not have access to this subscription as the subscription service provider 104 has not received payment. However, the subscriber user account will retain their account as it has not been canceled by the subscription service provider 104. At the point in the future when the subscriber user account wishes to resume the service with the subscription service provider 104, the subscriber user account will reauthorize the subscription to renew for another cycle by directly engaging with subscription management service's 106 interface (SMS and/or web) and switching a service "on", and/or by indicating usage of the subscription at the subscription service provider 104 by attempting to access the service. One example is shown in FIG. 7, where the user can toggle on or off existing and recommended subscription services. With the user account's opt-in, the subscription management service's 106 authorization server will approve the appropriate subscription service provider 104 and transaction value necessary to pay for and reactivate the subscription. When the subscription service provider 104 attempts to debit the subscription management service 106 card for the appropriate amount and the transaction succeeds, the subscription service provider 104 will then reinstate service for another service interval.

In an example, the subscriber user account will attempt to log into the subscription service at the subscription service provider 104. The subscription service provider 104 will attempt to retry the card and/or ask the subscriber's permission to retry the card. Once the subscriber grants permission, the subscription service provider 104 will successfully retry the card and service will be reinstated. On subscription management service's 106 end, once the transaction successfully goes through, the authorization server will then be instructed to not allow any subsequent charges from that merchant, thus preventing the subscription service provider 104 from auto-renewing the subscription in the future unless and until explicitly requested from the subscriber user account.

In some embodiments, the subscription management service 106 can provide functionality to allow the user account of the subscription management service 106 to manage a subscription at a subscription service provider 104 through their interactions with the subscription service provider 104 rather than requiring the user account to explicitly authorize the subscription management service 106 to pay for an upcoming service interval. With this approach, when a user account adds a subscription to be managed by the subscription management service 106, they can provide the account credentials that the subscriber user account utilizes for that specific subscription. Those credentials would be held in an encrypted vault where the subscription management service 106 would tokenize those credentials (the vault can be provided by a third-party security provider). Once the subscription management service 106 has on-demand access to the subscriber user account's credentials, the subscription management service 106 would then be able to automatically pause or resume the service using web automation technologies like SELENIUM.

Once the user account of the subscription management service 106 supplies the subscription management service 106 with the subscription credentials, the subscription management service 106 would access that account on behalf of the subscriber user account and either pause or cancel the subscription. The subscriber associated with the user account at the subscription management service 106 will still be able to use the service until the end of their prepaid cycle. Once the billing cycle ends, the subscriber user account would no longer have access to the subscription at the subscription service provider 104. Whenever the user would like to resume the subscription with the subscription service provider 104, using the same interface as described above, the subscription management service 106 would then be able to access that account and unpause or otherwise reinstate or reactivate the subscription.

In some embodiments, the subscription management service 106 can be integrated with the subscription service provider 104 as described with respect to the intermediate integration model or the most integrated integration model. Integrating with a subscription service provider 104 requires a custom endpoint from the subscription service provider 104's perspective where the subscription management service 106 is able to pause or resume a specific subscription. This capability would in turn allow subscription management service 106 to reactivate a subscription on the subscriber user account's behalf, thus allowing the subscriber user account to only pay for the subscriptions that they explicitly opt in to through active usage.

The subscription management service 106 can used federated log-in via OAuth2 to verify the identity of a subscriber of the subscription service provider 104 and also serves as subscriber user account authorization of payment for an access period or billing cycle of the subscription service provider 104.

Once integrated, a subscription service provider 104 will have visibility into a subscriber user account's status as an active, paying user. Where today, subscriber user accounts can be either active or churned with regards to their billing relationship, subscription management service 106 will be able to define and communicate to the subscription service provider 104 when a subscriber user account is active and paying, lapsed or inactive, or voluntarily churned from the service.

In some examples, the subscription management service 106 can provide a "Sign-in and Subscribe" feature, which can be manifested as a widget that would be available for more tightly integrated subscription service providers 104. When a subscription service provider 104 leverages this widget, the subscription management service 106 would be able to surface a call to action button within the subscription service providers 104 sign up page. When a subscription management service 106 user clicks on the call to action, they are seamlessly subscribed to the subscription service provider 104 with a single click to authorize. From there, the renewal of the subscription for a subsequent term will be delayed default until the subscriber user account attempts to access the subscription again in a later subscription term.

In practice, this would work as such: when a would-be subscriber clicks the "Sign-in and Subscribe" call to action button, this will then redirect the user to a subscription management service 106-hosted authorization page. This page would allow the user to authorize the initiation of a subscription through their subscription management service 106 account. Once the subscriber confirms this authorization, the subscription management service 106 will create a subscription with the subscription service provider 104 and obtain an authorization token from them—both of these steps will take place on the backend. Once the token is obtained, it will then be served up to the frontend, which will, in turn, trigger an authentication with the subscription service provider 104, thus allowing the user account to access the service. This process can utilize Oauth 2 technology.

In some examples, the subscription management service 106 can provide Dynamic Bundling. Dynamic bundling is a feature by which a subscriber would be able to seamlessly opt-in to bundled offers from multiple subscription service providers 104. Using a similar architecture to Sign-in and Subscribe, existing subscriber user accounts can access and authorize payment for additional services, however subscription service providers 104 will be able to offer customized discounts based on what subscriptions a subscriber user account has already activated in that billing cycle. To give an example, a subscriber device could qualify for an exclusive discount to activate a music streaming service (e.g., SPOTIFY) because they already have activated a video content streaming service (e.g., HULU) in the same billing cycle. The subscription management service 106 is able to identify which services subscriber user account are actively subscribing to in a given cycle.

Figure 5:
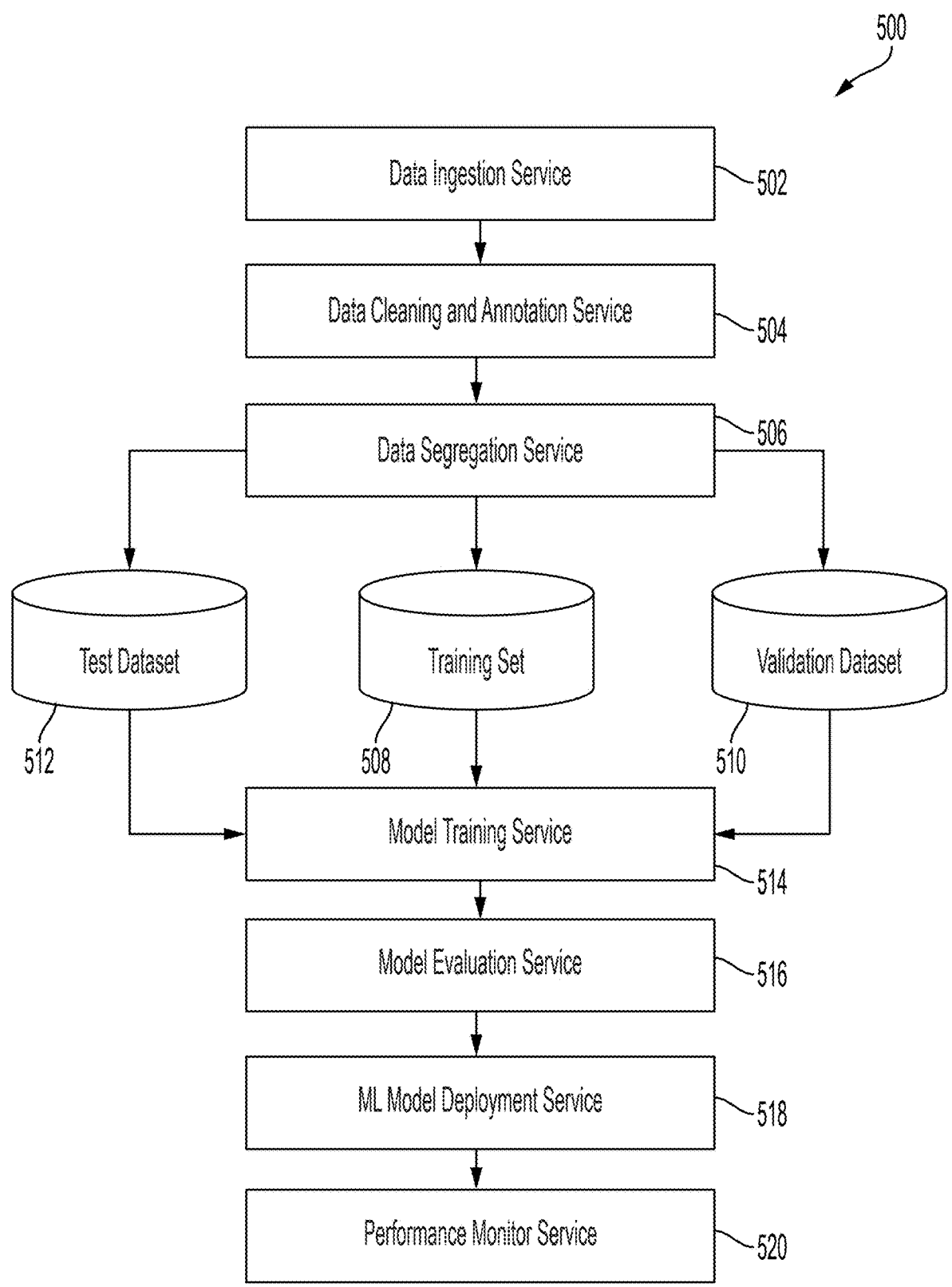
FIG. 5 illustrates an example lifecycle of a machine learning ("ML") model in accordance with some aspects of the present technology.

FIG. 5 illustrates an example lifecycle 500 of a ML model in accordance with some examples. This example lifecycle 500 can be used in step 270 to recommend alterations to the user account's subscription plan, and can be embedded within the ML analysis service 132 of the subscription management service 106.

The first stage of the lifecycle 500 of a ML model is a data ingestion service 502 to generate datasets described below. ML models require a significant amount of data for the various processes described in FIG. 5 and the data persisted without undertaking any transformation to have an immutable record of the original dataset. The data can be provided from third party sources such as publicly available dedicated datasets, or alternatively can be provided from internal data sets that are sufficient to train the ML model. The data ingestion service 502 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 502 retrieves the data. In some examples, the data ingestion service 502 may be online and the data is streamed from the producer in real-time for storage in the data ingestion service 502.

After data ingestion service 502, a data preprocessing service preprocesses the data to prepare the data for use in the lifecycle 500 and includes at least data cleaning, data transformation, and data selection operations. The data cleaning and annotation service 504 removes irrelevant data (data cleaning) and general preprocessing to transform the data into a usable form. The data cleaning and annotation service 504 includes labelling of features relevant to the ML model. In some examples, the data cleaning and annotation service 504 may be a semi-supervised process performed by a ML to clean and annotate data that is complemented with manual operations such as labeling of error scenarios, identification of untrained features, etc.

After the data cleaning and annotation service 504, data segregation service 506 to separate data into at least a training set 508, a validation dataset 510, and a test dataset 512. Each of the training set 508, a validation dataset 510, and a test dataset 512 are distinct and do not include any common data to ensure that evaluation of the ML model is isolated from the training of the ML model.

The training set 508 is provided to a model training service 514 that uses a supervisor to perform the training, or the initial fitting of parameters (e.g., weights of connections between neurons in artificial neural networks) of the ML model. The model training service 514 trains the ML model based a gradient descent or stochastic gradient descent to fit the ML model based on an input vector (or scalar) and a corresponding output vector (or scalar).

After training, the ML model is evaluated at a model evaluation service 516 using data from the validation dataset 510 and different evaluators to tune the hyperparameters of the ML model. The predictive performance of the ML model is evaluated based on predictions on the validation dataset 510 and iteratively tunes the hyperparameters based on the different evaluators until a best fit for the ML model is identified. After the best fit is identified, the test dataset 512, or holdout data set, is used as a final check to perform an unbiased measurement on the performance of the final ML model by the model evaluation service 516. In some cases, the final dataset that is used for the final unbiased measurement can be referred to as the validation dataset and the dataset used for hyperparameter tuning can be referred to as the test dataset.

After the ML model has been evaluated by the model evaluation service 516, an ML model deployment service 518 can deploy the ML model into an application or a suitable device. The deployment can be into a further test environment such as a simulation environment, or into another controlled environment to further test the ML model.

After deployment by the ML model deployment service 518, a performance monitor service 520 monitors for performance of the ML model. In some cases, the performance monitor service 520 can also record additional transaction data that can be ingested via the data ingestion service 502 to provide further data, additional scenarios, and further enhance the training of ML models.

As addressed above, the sources and type of data that can be accessible to the ML service can include data about offerings from a plurality of subscription service providers

206. For example, the data can include data about pricing and length of subscriptions. The data can include information about services (or content) provided, and information about when new offerings are made available. The data can also include information about services (or content) consumed by specific user accounts, among other data. The data can also include social media data and advertisement data, both of which provide signals about the perception of the market of subscribers. All of this data can be aggregated across a plurality of subscription service providers 206.

In some examples, the ML service can utilize the data to identify similar user accounts. Similar user accounts might be those that subscribe to the same subscription service providers, or user accounts the consume the same services (or content). The ML service can identify user accounts as similar using mechanisms such as representing the user account in an embedding space and clustering proximate users in the embedding space into clusters of similar users, or through a classification model.

Just as user accounts can be identified as similar, subscription service providers 206 can also be identified as similar.

The ML service can include one or more models that can be optimized to achieve specific training goals, such as correct classifications, or can be optimized by a function that aims to achieve a goal (less unsubscribe requests, or greater revenue).

One specific model or heuristic can be to identify users that are likely to request to unsubscribe from one or more services. In a simple version of such a model, the ML service can determine that similar users to a specific user account are seeing an increase in unsubscribe requests. Another version of such a model could be a classifier that predicts how likely a user is to request to unsubscribe at a configured period in the future. For example, such a model could predict whether a user is likely to unsubscribe in the next year based on other subscriptions that the user account has and the terms of the subscription and other factors.

A similar model could be a classifier to predict whether a user will request to resubscribe within the next 6 months or 1 year. Or a classifier could predict whether a discounted subscription or reduced tier of subscription would be likely to retain the user account as a subscriber.

The ML model could also be used to identify causes for unsubscribe requests. For example, when the subscription management service 106 is providing analytics for a plurality of video streaming services, the ML model can determine that a first subscriber is currently receiving unsubscribe requests because a second service has a hit show that is consuming many users available watching hours. For example, the subscription management service 106 can be aware of the new show or movie available from the second service, and can include data about a number of user accounts watching the new show or movie, and can include data about social media posts mentioning the new show. Based on this data, the ML model can identify that the new show is causing user accounts to want a temporary suspension of their user account. The ML model could also suggest a limited tier of subscription to users that are most likely to request to unsubscribe in order to keep the subscriber until the subscriber user account is ready to engage with the service again.

In some embodiments, such as in the most integrated engagement model, the ML model can identify that a segment of user accounts desires to watch one show on a first streaming service provider, a second show on a second streaming service provider, and some live sporting events. In response, the ML model can recommend a bundle that provides limited access to the first streaming service provider, second streaming service provider, and access to four live sporting events in a month, and can create a bundle just for this group of users. In some embodiments, the ML model can be configured to optimize revenue for each of the subscription service providers 104.

These and other insights are possible because the subscription management service 106 can receive data from across the subscription economy. And by providing insights that are ultimately helpful in keeping relationships with user accounts through periods where the user accounts might not want to engage with a subscriptions service provider 106, lots of compute power and bandwidth can be saved by stemming a cycle of unsubscribes and resubscribes.

Figure 6:
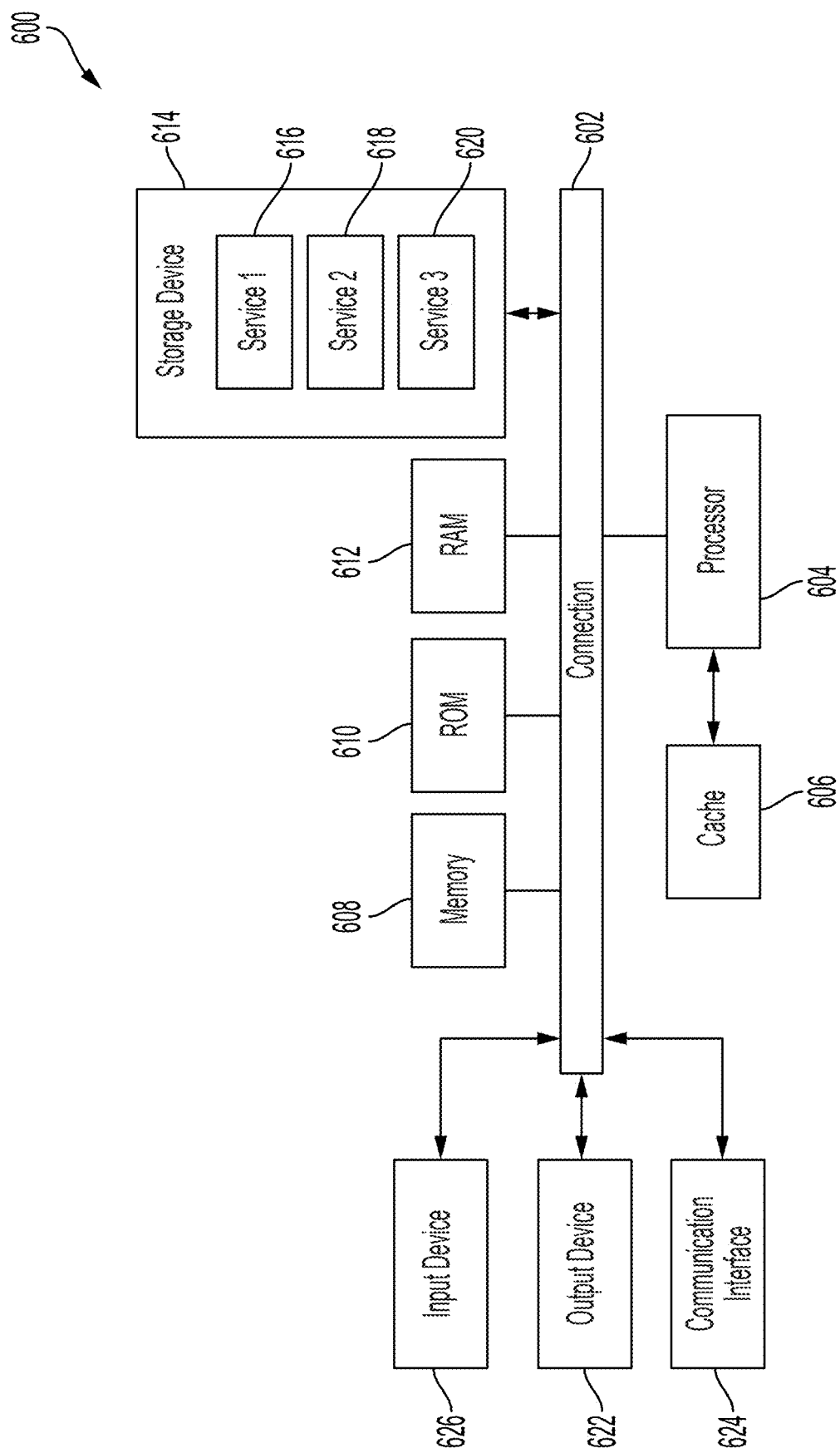
FIG. 6 shows an example of a system for implementing certain aspects of the present technology.

FIG. 6 shows an example of computing system 600, which can be for example any computing device making up subscription management service 102, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric. The processor 604 can also include logical elements such as the decision logic necessary for the subscription management service 106 to determine whether the user account's subscription should be modified.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

FIG. 7 illustrates a user interface displayable to a subscriber user account from a subscription management service. The display 112 of the subscription user account 102 may display a list of subscriptions with monthly prices and toggle switches all set to off if the subscriber has not interacted with or used the subscription service in a predetermined or user-defined amount of time (e.g., in the last month). The display 112 may also display a list of recommended subscription services based on machine-learning, as discussed above in more detail. On the back end, the user interface provided by the display 112 can then communicate with the subscription service provider 104 of the various services to cancel or enroll in the subscription services based on the toggled-on or toggled-off services of the user interface.

As shown, the subscription selection interface 700 can include a header 702 that indicates the title of the webpage providing the interface 700, and an existing subscriptions list 104 alongside a recommended subscriptions list 706. The existing subscriptions list 104 and recommended subscriptions list 706 can each include a toggle 708 to allow the user to toggle the subscription services to on (plus sign) or off (minus sign). It should be appreciated that the plus and minus toggle is for exemplary purposes only, and the subscription selection interface 700 may include any user-selectable manner of choosing whether subscriptions services should be renewed. As shown, the existing subscriptions list 704 and recommended subscriptions list 706 can include the names and prices of the subscriptions.

The subscriptions selection interface 700 may be displayed on a display 112 of the subscriber user account 102, but is served from the subscription management service 106 based on the usage database 130 of the subscriber associated with the subscriber user account 102 as well as, in some embodiments, other subscribers. In this manner, the subscriber user account 102 need not interact with multiple interfaces for multiple independent subscription services, but can simply toggle on and off the preferred subscription services.

The subscription services listed on the subscriptions selection interface 700 may be automatically displayed due to inactivity of the user, for example, if the user has not accessed the subscription service for a predetermined amount of time or has accessed the subscription service below a threshold amount over a predetermined amount of time. Alternatively, or in addition to the above, the subscription services listed on the subscriptions selection interface 700 can be displayed based on machine-learning of the user based on data provided by the usage database 130. For example, the ML analysis service 132 of the subscription management service 106 may determine the user associated with the subscriber user account 102 watches sports more than any other content, and recommend the user remove subscriptions that are less focused on sports. In the same manner, the ML analysis service 132 can recommend sports-related content in the recommended subscriptions list 706. The ML analysis service 132 can also make subscription recommendations, or subscription cancellation recommendations, based on activities of other users from data stored in the usage database 130. For example, the ML analysis service 132 can recommend the subscriber user account 102 cancel non-sports related content because the data stored in the usage database 130 suggests users who consume similar content as the subscriber user account 102 prefer sports above all other content. The ML analysis service 132 can also recommend sports content in the recommended subscribers list 706 based on similar content consumption behavior of other users.

The subscription selection interface 700 can therefore act as the gateway between the ML analysis service 132 and usage database 130, and the subscriber user account 102 to solve the technological problems discussed herein. That is, the subscription selection interface 700 can consolidate all subscription management interfaces into one subscription selection interface 700 to reduce the number of pages the user is required to access (and be served) in order to activate or cancel subscriptions. This reduces the amount of computing resources needed to manage subscriptions and conduct onboarding and cancellation of subscriptions, as well as reducing the number of logins required to access subscription services. By providing one centralized system, the subscription management service 106 also allows for more efficient targeted advertising and recommendations by basing the machine-learned recommendations from a single usage database 130 associated with the user and other users, rather than having the user subjected to multiple recommendations from disparate, independent subscription services.

The subscription selection interface 700 can also act as an interface that allows a subscriber user account 102 to manage multiple subscription services with one login, password, and payment card. For example, the subscriber user account 102 can accept the recommendation of FIG. 7 to enroll in YOUTUBE TV, and the subscription management service 106 can interact with the subscription service provider 104 for YOUTUBE TV with little or no additional interaction by the user. In this case, the subscription management service 106 can retrieve the username and password of the subscription user account 102 from the usage database 130 and the payment information from the payment gateway 131 and provide all of this information to the subscription service provider 104 for automatic enrollment of a user account with YOUTUBE TV. A user with one account managed by the subscription management service 106 can therefore sign up for another service managed by the subscription management service 106 without reentering payment information or creating a new user account, saving computing resources, bandwidth, data transfer, and multiple renderings of interfaces.

Figure 8A:
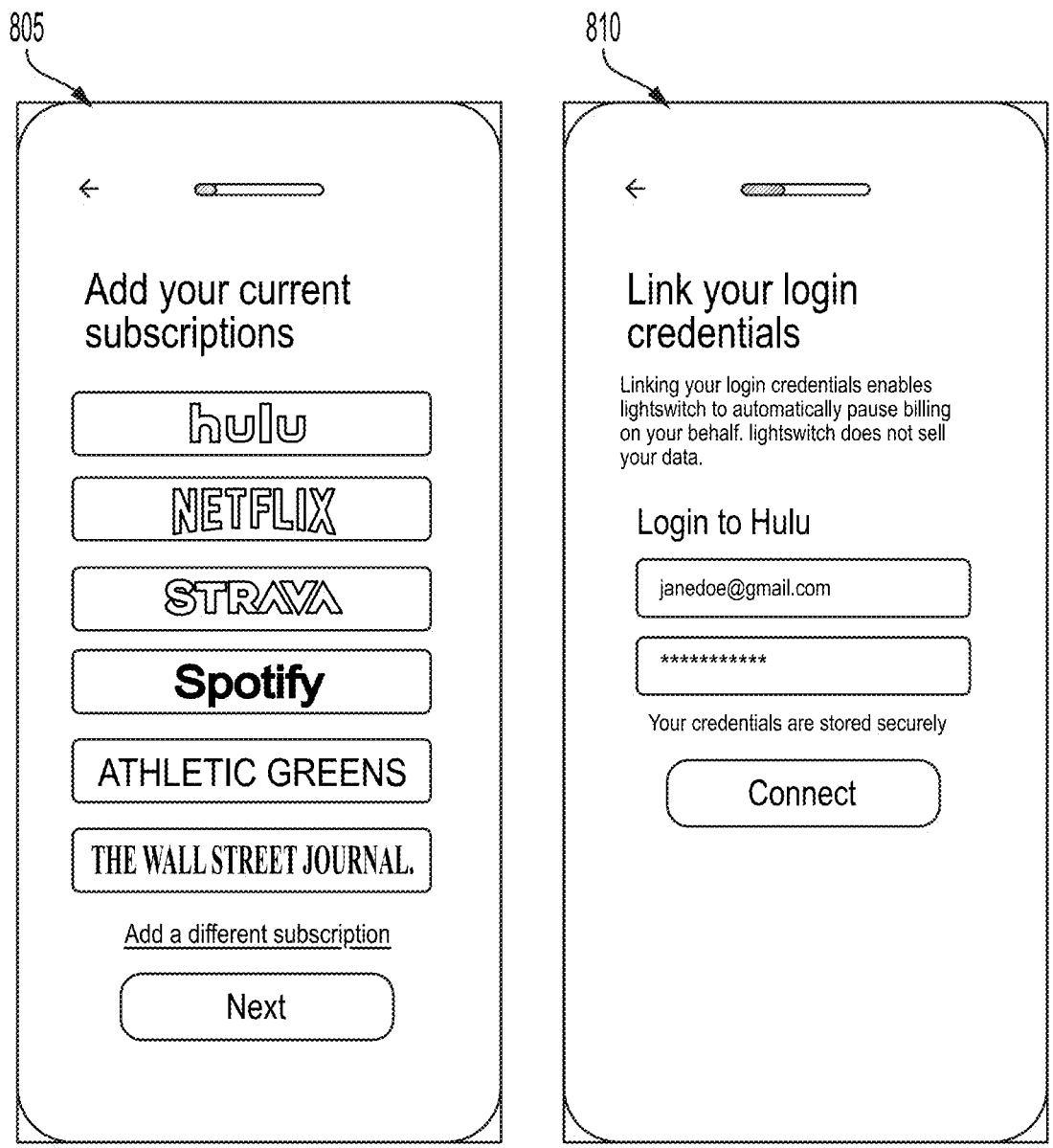
Figure 8C:
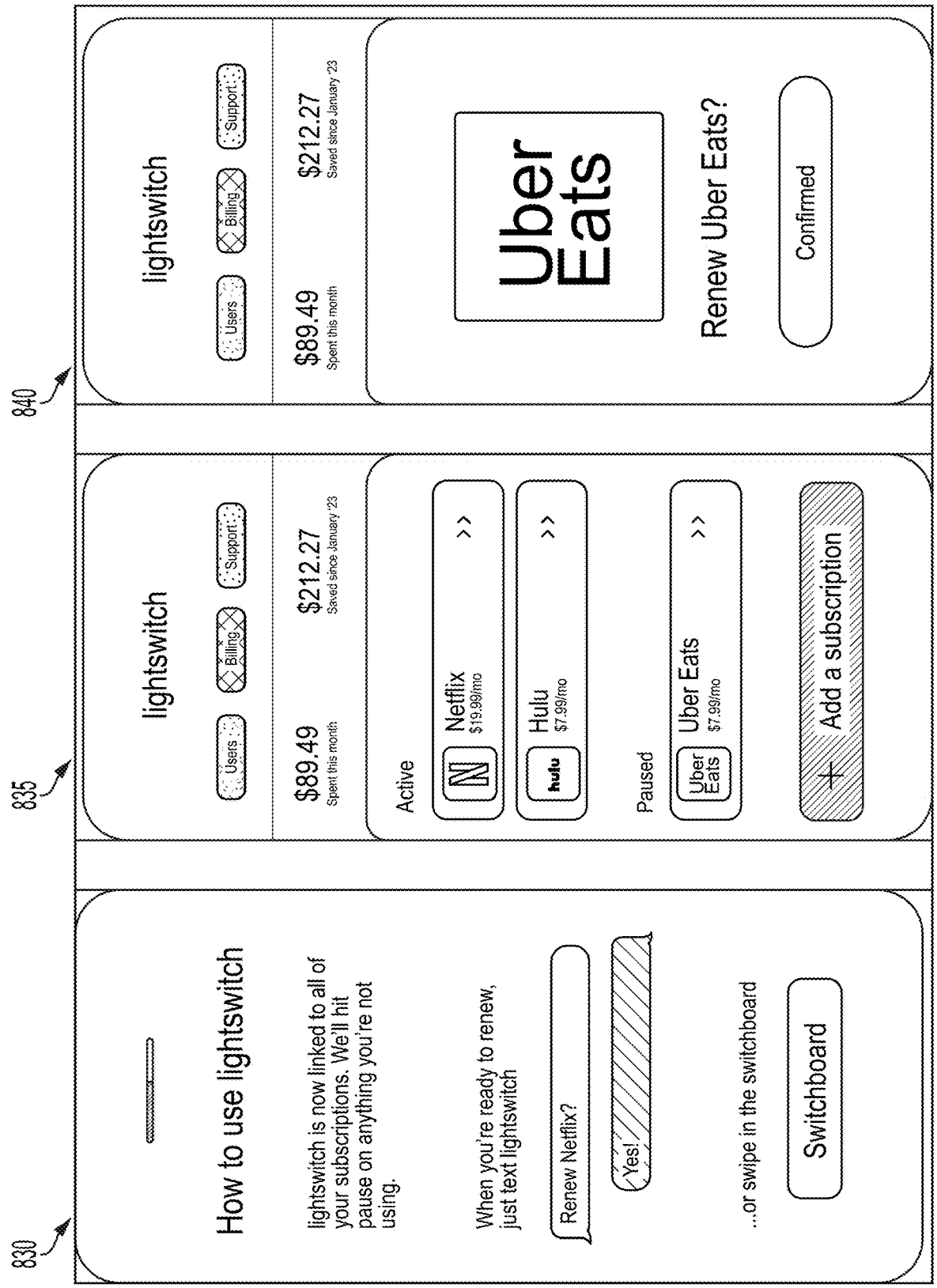

FIGS. 8A, 8B, and 8C illustrate a collection of user interfaces for enabling some aspects of the present technology. In particular, the interfaces shown in FIGS. 8A, 8B, and 8C can constitute portions of an onboarding flow for bringing accounts with subscription service providers 104 under the management of the subscription management service 106.

FIG. 8A illustrates an example subscription integration interface 805. In the example subscription integration interface 805, a plurality of common subscription service providers 104 can be listed for selection by a user account of the subscription management service 106.

As illustrated in subscription provider credential interface 810, the user account selected to add their HULU subscription in subscription integration interface 805 which resulted in a progression to present the subscription provider credential interface 810. In this case subscription provider credential interface 810 is to provide subscription credentials for the subscription service HULU. The user account can enter their credentials to access the HULU subscription service, whereby subscription management service 106 can gain access to the user account's HULU subscription on behalf of the user account through an API to the HULU subscription service.

After the user account has provided credentials to the subscription service provider in the subscription provider credential interface 810, the subscription management service 106 can communicate with subscription service provider 104 to gather information about the user account with subscription service provider 104. In this case, the subscription management service 106 can discover information about the user account with the subscription service HULU. Subscription management service 106 can discover information such as a current subscription plan, the term of a plan, the amount of the plan, the amount of other advertised plans currently being offered to the user account by the service provider, and information about profiles associated with the user account. After gathering information about the user account with the subscription service provider 104, the subscription management service 106 can present one or more interfaces to confirm aspects of the user account subscription with the subscription service provider 104. For example, profile onboarding interface 815 is an example of such an interface.

As illustrated in FIG. 8B, the profile onboarding interface 815 illustrates other users/profiles with the subscription service provider 104 that was onboarded, e.g, the user account onboarded with HULU might be managed by Monica who provided their credentials in the subscription provider credential interface 810, but also uses the service with other people in the household such as Sunny 818, Andy 823, and Joyce 823.

The profile onboarding interface identifies the existing set of users who are granted access and/or authority rights to the user account. For example, the profile onboarding interface 815 can provide a listing of an authorized user 813 and an access-only user 823. The authorized user 813 can be an individual who has rights to maintain a user account and make decisions about the subscription with the subscription service. This user can authorize the cancellation, pause, or the continuation of the subscription service, and can also add additional users to the subscription service.

To add an access-only user 823, that was not imported from the subscription service, the authorized user 818 can enter the phone number, email address, or other identifying information in space 828, then tap or click the invite button 833 to invite that individual to be an access-only user 823. Alternatively, the authorized user 818 can select the "Skip for now" button if the authorized user 818 does not wish to add any new users.

In some embodiments, the account information learned from a first subscription service can be stored by the subscription management service 106 and applied to other subscriptions. For example, the information learned about individual profiles under the user account for HULU can be applied to other subscription provider services 104. For example, if the user account with the subscription management service 106 also has a subscription with NETFLIX but does not have any profiles set up under their NETFLIX account, subscription management service 106 can automatically create profiles with NETFLIX that mirror the profiles that the user account has at HULU. in another example, any information that the subscription management service 106 has learned about the user account may be used to automatically sign up for subscriptions with other subscription provider services 104.

The process illustrated in subscription integration interface 805, the subscription provider credential interface 810, and the subscription profile onboarding interface 810 can be repeated for as many subscription services as desired.

In some embodiments, the subscription management service 106 can also extend subscription account features to subscription provider services 104 that don't have those account features. For example, if a subscription service provider 104 does not natively support the concept of profiles under a user account, the subscription management service can provide this functionality to a subscription service provider 104. For example, this can be accomplished by offering an API to the subscription service provider 104 such that the subscription provider's 104 servers can call an API for profiles and surface a user interface with data provided by the subscription management service 106 with the list of profiles under the user account. This can provide a benefit to the subscription service provider 104 because the subscription service provider 104 can now gain more granular information about individual users associated with the user account that are consuming services related to the subscription. This would be information that would be otherwise unavailable to the subscription service provider 104 without natively providing a user interface, database, and logic to support such an account feature.

The subscription analysis interface 820 can be presented after one or more subscription services have been onboarded to the subscription management service 106. The subscription analysis interface 820 includes promotional and informational graphics, data, and other helpful information to assist the user in completing the transaction. As shown, the subscription analysis interface 820 provides a quantification of the user's subscription spending on a periodic basis (e.g., monthly), and an estimate of how much the user can save over the course of a period (e.g., year) should the user elect to use the subscription management service 106 in the manner shown by FIG. 8B. The authorized user 818 can then select the next button 843 again to move to the payment method interface 825.

In the payment method interface 825, the user is directed to a payment platform that is either internal to the subscription management service 106 or coupled thereto in some manner. For example, the payment method interface 825 can link the authorized user 818 to the payment network 110 for payment for the subscriptions managed by the subscription management service 106. Here, the authorized user 818 can select payment by either debit card 848 or by bank payment (e.g., e-check) 853, and complete the transaction.

FIG. 8C illustrates an example renewal instruction interface 830. In renewal instruction interface 830, the user interface can present instructions to a user of the user account at the subscription management service 106 about how they can renew any subscription by texting the subscription management service 106 with an instruction to renew. The renewal instructions interface 830 also provides instructions and a link to the switchboard interface 835 which can allow the user account to turn on or off subscriptions to subscription services managed by the subscription management service 106. The switchboard interface 835 illustrated in FIG. 8C is another variation of the interface illustrated in FIG. 7.

The switchboard interface 835 can include the list active and paused subscriptions. By clicking on one of the managed subscriptions, for example, the paused subscription to UBER EATS, a specific interface for managing that subscription can be presented. For example, the renew service interface 840 can be presented, whereby a user can confirm that they would like to renew their subscription to UBER EATS for another billing cycle. The input provided in the switchboard interface 835 or the renew service interface 840 can be communicated to the subscription service provider 104 via an API to effect the change in subscription status for the user account.

For clarity of explanation, in some instances, the present technology may be presented as including individual functional blocks including functional blocks comprising devices, device components, steps or routines in a process embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures. The present technology includes computer-readable storage mediums for storing instructions, and systems for executing any one of the methods embodied in the instructions addressed in the aspects of the present technology presented below:

Aspect 1. A method for automated management of a subscription service provided by a subscription provider, the method comprising: receiving, at a subscription management service, a request for a software development kit (SDK) that permits a subscription service provider to enable a user account to make a selection within a selection interface; providing the SDK to the subscription service provider to enable the subscription service provider to establish the selection interface on a platform of the subscription service provider; receiving instructions from the subscription service provider that cause the SDK to provide a selection interface to a user account; receiving a user account selection from the selection interface to enroll a user account in a subscription management service; requesting and receiving subscription data from the subscription service provider; analyzing, at the subscription management service, the subscription data using decision logic of the subscription management service; determining, at the subscription management service, whether the subscription data meets one of a plurality of predetermined thresholds based on the analyzing; and querying the user account to modify one of a scope or duration of the subscription service if the determining determines the subscription data meets one of the plurality of predetermined thresholds, and returning to the requesting and receiving if the determining determines the subscription data does not meet one of the predetermined thresholds.

Aspect 2. The method of Aspect 1, wherein the determining includes comparing the subscription data against data of other user accounts and, using machine learning, determining whether the subscription data exceeds a predetermined statistical threshold of the subscription data of the other user accounts.

Aspect 3. The method of any of Aspects 1 to 2, wherein the determining whether the subscription data exceeds a predetermined statistical threshold of the subscription data of the other user accounts includes averaging a usage duration of the other user accounts and comparing an average usage duration of other user accounts to a usage duration of the user account.

Aspect 4. The method of any of Aspects 1 to 3, wherein the analyzing includes analyzing the subscription data for user account interaction with the subscription service to determine which aspects of the subscription service are being consumed by the user account.

Aspect 5. The method of any of Aspects 1 to 4, wherein the SDK is provided within a selection interface editing environment that is separate from the subscription management service.

Aspect 6. The method of any of Aspects 1 to 5, wherein the requesting and receiving subscription data is performed by requesting the subscription data stored within a subscription usage database from a subscriber device data application programming interface (API) of the subscription service provider.

Aspect 7. The method of any of Aspects 1 to 6, wherein the requesting and receiving can include the subscription management service requesting access tokens from the subscription management service.

Aspect 8. A system for automated management of a subscription service provided by a subscription provider, the system comprising: a storage configured to store instructions; at least one processor configured to execute the instructions and cause the at least one processor to: receive, at a subscription management service, a request for a SDK that permits a subscription service provider to enable a user account to make a selection within a selection interface; provide the SDK to the subscription service provider to enable the subscription service provider to establish the selection interface on a platform of the subscription service provider; receive instructions from the subscription service provider that cause the SDK to provide a selection interface to a user account; receive a user account selection from the selection interface to enroll a user account in a subscription management service; request and receive subscription data from the subscription service provider; analyze, at the subscription management service, the subscription data using decision logic of the subscription management service; determine, at the subscription management service, whether the subscription data meets one of a plurality of predetermined thresholds based on the analyzing; and query the user account to modify one of a scope or duration of the subscription service if the determining determines the subscription data meets one of the plurality of predetermined thresholds, and returning to the requesting and receiving if the determining determines the subscription data does not meet one of the predetermined thresholds.

Aspect 9. The system of Aspect 8, wherein the determining includes comparing the subscription data against data of other user accounts and, using machine learning, determining whether the subscription data exceeds a predetermined statistical threshold of the subscription data of the other user accounts.

Aspect 10. The system of any of Aspects 8 to 9, wherein the determining whether the subscription data exceeds a predetermined statistical threshold of the subscription data of the other user accounts includes averaging a usage duration of the other user accounts and comparing an average usage duration of other user accounts to a usage duration of the user account.

Aspect 11. The system of any of Aspects 8 to 10, wherein the analyzing includes analyzing the subscription data for user account interaction with the subscription service to determine which aspects of the subscription service are being consumed by the user account.

Aspect 12. The system of any of Aspects 8 to 11, wherein the SDK is provided within a selection interface editing environment that is separate from the subscription management service.

Aspect 13. The system of any of Aspects 8 to 12, wherein the request and receive subscription data is performed by requesting the subscription data stored within a subscription usage database from a subscriber device data API of the subscription service provider.

Aspect 14. The system of any of Aspects 8 to 13, wherein the request and receive includes the subscription management service requesting access tokens from the subscription management service.

Aspect 15. A non-transitory computer readable medium comprising instructions, the instructions, when executed by a computing system, cause the computing system to: receive, at a subscription management service, a request for a SDK that permits a subscription service provider to enable a user account to make a selection within a selection interface; provide the SDK to the subscription service provider to enable the subscription service provider to establish the selection interface on a platform of the subscription service provider; receive instructions from the subscription service provider that cause the software development kit to provide a selection interface to a user account; receive a user account selection from the selection interface to enroll a user account in a subscription management service; request and receive subscription data from the subscription service provider; analyze, at the subscription management service, the subscription data using decision logic of the subscription management service; determine, at the subscription management service, whether the subscription data meets one of a plurality of predetermined thresholds based on the analyzing; and query the user account to modify one of a scope or duration of the subscription service if the determining determines the subscription data meets one of the plurality of predetermined thresholds, and returning to the requesting and receiving if the determining determines the subscription data does not meet one of the predetermined thresholds.

Aspect 16. The non-transitory computer readable medium of Aspect 15, wherein the determining includes comparing the subscription data against data of other user accounts and, using machine learning, determining whether the subscription data exceeds a predetermined statistical threshold of the subscription data of the other user accounts.

Aspect 17. The non-transitory computer readable medium of any of Aspects 15 to 16, wherein the analyzing includes analyzing the subscription data for user account interaction with the subscription service to determine which aspects of the subscription service are being consumed by the user account.

Aspect 18. The non-transitory computer readable medium of any of Aspects 15 to 17, wherein the SDK is provided within a selection interface editing environment that is separate from the subscription management service.

Aspect 19. The non-transitory computer readable medium of any of Aspects 15 to 18, wherein the request and receive subscription data is performed by requesting the subscription data stored within a subscription usage database from a subscriber data application programming interface of the subscription service provider.

Aspect 20. The non-transitory computer readable medium of any of Aspects 15 to 19, wherein the request and receive includes the subscription management service requesting access tokens from the subscription management service.

What is claimed is:

1. A method for automated management of a subscription service provided by a subscription provider, the method comprising:
 receiving, at a subscription management service, a request for a software development kit (SDK) that permits a subscription service provider to enable a user account to make a selection within a selection interface;
 providing the SDK to the subscription service provider to enable the subscription service provider to establish the selection interface on a platform of the subscription service provider;
 receiving instructions from the subscription service provider that cause the software development kit to provide a selection interface to a user account;

receiving a user account selection from the selection interface to enroll a user account in the subscription management service;

receiving subscription data from the subscription service provider;

analyzing, at the subscription management service, the subscription data using decision logic of the subscription management service;

determining, at the subscription management service, whether the subscription data meets one of a plurality of predetermined thresholds based on the analyzing; and prompting the user account to modify one of a scope or duration of the subscription service when the determining determines the subscription data meets one of the plurality of predetermined thresholds.

2. The method of claim 1, wherein the determining includes comparing the subscription data against data of other user accounts and, using machine learning, determining whether the subscription data exceeds a predetermined statistical threshold of the subscription data of the other user accounts.

3. The method of claim 1, wherein the analyzing includes analyzing the subscription data for user account interaction with the subscription service to determine which aspects of the subscription service are being consumed by the user account.

4. The method of claim 1, wherein the SDK is provided within a selection interface editing environment that is separate from the subscription management service.

5. The method of claim 1, wherein the receiving subscription data is performed by requesting the subscription data stored within a subscription usage database from a subscriber data application programming interface (API) of the subscription service provider.

6. The method of claim 1, wherein the receiving subscription data can include the subscription management service requesting access tokens from the subscription service provider.

7. The method of claim 2, wherein the determining whether the subscription data exceeds a predetermined statistical threshold of the subscription data of the other user accounts includes averaging a usage duration of the other user accounts and comparing an average usage duration of other user accounts to a usage duration of the user account.

8. A system for automated management of a subscription service provided by a subscription provider, the system comprising:

a storage configured to store instructions;

at least one processor configured to execute the instructions and cause the at least one processor to:

receive, at a subscription management service, a request for a software development kit (SDK) that permits a subscription service provider to enable a user account to make a selection within a selection interface;

provide the SDK to the subscription service provider to enable the subscription service provider to establish the selection interface on a platform of the subscription service provider;

receive instructions from the subscription service provider that cause the SDK to provide a selection interface to a user account;

receive a user account selection from the selection interface to enroll a user account in the subscription management service;

request and receive subscription data from the subscription service provider;

analyze, at the subscription management service, the subscription data using decision logic of the subscription management service;

determine, at the subscription management service, whether the subscription data meets one of a plurality of predetermined thresholds based on the analyzing; and prompt the user account to modify one of a scope or duration of the subscription service if the determining determines the subscription data meets one of the plurality of predetermined thresholds, and returning to the requesting and receiving subscription data if the determining determines the subscription data does not meet one of the predetermined thresholds.

9. The system of claim 8, wherein the determine includes comparing the subscription data against data of other user accounts and, using machine learning, determining whether the subscription data exceeds a predetermined statistical threshold of the subscription data of the other user accounts.

10. The system of claim 8, wherein the analyze includes analyzing the subscription data for user account interaction with the subscription service to determine which aspects of the subscription service are being consumed by the user account.

11. The system of claim 8, wherein the SDK is provided within a selection interface editing environment that is separate from the subscription management service.

12. The system of claim 8, wherein the request and receive subscription data is performed by requesting the subscription data stored within a subscription usage database from a subscriber data API of the subscription service provider.

13. The system of claim 8, wherein the request and receive includes the subscription management service requesting access tokens from the subscription service provider.

14. The system of claim 9, wherein the determine whether the subscription data exceeds a predetermined statistical threshold of the subscription data of the other user accounts includes averaging a usage duration of the other user accounts and comparing an average usage duration of other user accounts to a usage duration of the user account.

15. A non-transitory computer readable medium comprising instructions, the instructions, when executed by a computing system, cause the computing system to:

receive, at a subscription management service, a request for a software development kit (SDK) that permits a subscription service provider to enable a user account to make a selection within a selection interface;

provide the SDK to the subscription service provider to enable the subscription service provider to establish the selection interface on a platform of the subscription service provider;

receive instructions from the subscription service provider that cause the SDK to provide a selection interface to a user account;

receive a user account selection from the selection interface to enroll a user account in the subscription management service;

request and receive subscription data from the subscription service provider;

analyze, at the subscription management service, the subscription data using decision logic of the subscription management service;

determine, at the subscription management service, whether the subscription data meets one of a plurality of predetermined thresholds based on the analyzing; and modify a subscription of the user account to pause the subscription to the subscription service without subscribing.

16. The non-transitory computer readable medium of claim 15, wherein the determine includes comparing the subscription data against data of other user accounts and, using machine learning, determining whether the subscription data exceeds a predetermined statistical threshold of the subscription data of the other user accounts.

17. The non-transitory computer readable medium of claim 15, wherein the analyze includes analyzing the subscription data for user account interaction with the subscription service to determine which aspects of the subscription service are being consumed by the user account.

18. The non-transitory computer readable medium of claim 15, wherein the SDK is provided within a selection interface editing environment that is separate from the subscription management service.

19. The non-transitory computer readable medium of claim 15, wherein the request and receive subscription data is performed by requesting the subscription data stored within a subscription usage database from a subscriber data application programming interface of the subscription service provider.

20. The non-transitory computer readable medium of claim 15, wherein the request and receive subscription data includes the subscription management service requesting access tokens from the subscription service provider.

* * * * *